March 25, 1941.   R. E. CONOVER   2,236,086
ELECTRICAL CIRCUIT FOR DIRECT CURRENT MOTORS
Filed Nov. 16, 1937   4 Sheets-Sheet 1

*INVENTOR*
RICHARD E. CONOVER
BY Brackett, Hyde, Higley & Meyer
*ATTORNEYS*

March 25, 1941.    R. E. CONOVER    2,236,086
ELECTRICAL CIRCUIT FOR DIRECT CURRENT MOTORS
Filed Nov. 16, 1937    4 Sheets-Sheet 2

INVENTOR
RICHARD E. CONOVER
BY
Brockett, Hyde, Higley & Mayer
ATTORNEYS

March 25, 1941.  R. E. CONOVER  2,236,086
ELECTRICAL CIRCUIT FOR DIRECT CURRENT MOTORS
Filed Nov. 16, 1937   4 Sheets-Sheet 3

INVENTOR
RICHARD E. CONOVER
BY
Brackett, Hyde, Higley & Mayer
ATTORNEYS

March 25, 1941.   R. E. CONOVER   2,236,086
ELECTRICAL CIRCUIT FOR DIRECT CURRENT MOTORS
Filed Nov. 16, 1937   4 Sheets-Sheet 4

INVENTOR
RICHARD E. CONOVER
BY
ATTORNEYS

Patented Mar. 25, 1941

2,236,086

UNITED STATES PATENT OFFICE 2,236,086

ELECTRICAL CIRCUIT FOR DIRECT CURRENT MOTORS

Richard E. Conover, Dayton, Ohio

Application November 16, 1937, Serial No. 174,789

3 Claims. (Cl. 171—312)

My invention relates to electrical circuits for controlling the speed of direct current motors and more particularly to an electrical circuit by means of which a predetermined motor speed may be maintained.

In direct current motors it is often desirable to operate the motor at a predetermined speed, irrespective of variations in the load. In accordance with my invention I have provided an improved circuit by means of which current may be supplied to a direct current motor from an alternating source of power and by means of which the speed of the motor may be maintained substantially constant, irrespective of variations in the load. In my improved circuit, adjustable means are also provided for varying the speed at which the motor operates and when the direct current motor is adjusted to the desired speed, automatic means are provided for maintaining that speed even though the load is varied.

It is therefore an object of my invention to provide a circuit for controlling direct current motors by means of which the speed of the motor may be maintained substantially constant, irrespective of load fluctuations.

Another object of my invention is to provide a circuit for controlling direct current motors by means of which the motor may be operated at a predetermined speed and by means of which the speed may be maintained substantially constant through varied load fluctuations.

Another object of my invention is to provide a circuit for controlling the operation of direct current motors from an alternating current source of power including a discharge tube for rectifying the alternating current and in which means are provided for utilizing a portion of the rectified current for controlling the speed of the motor.

A further object of my invention is to provide a circuit for controlling direct current motors from an alternating source of power, including an ignition controlled discharge tube and an improved phaser for controlling the discharge of the tube.

My invention will be better understood by reference to the accompanying drawings in which Fig. 1 is an improved circuit, showing means for supplying current from an alternating source of power to a direct current motor and means for varying the amount of current supplied to the motor;

Figure 1:
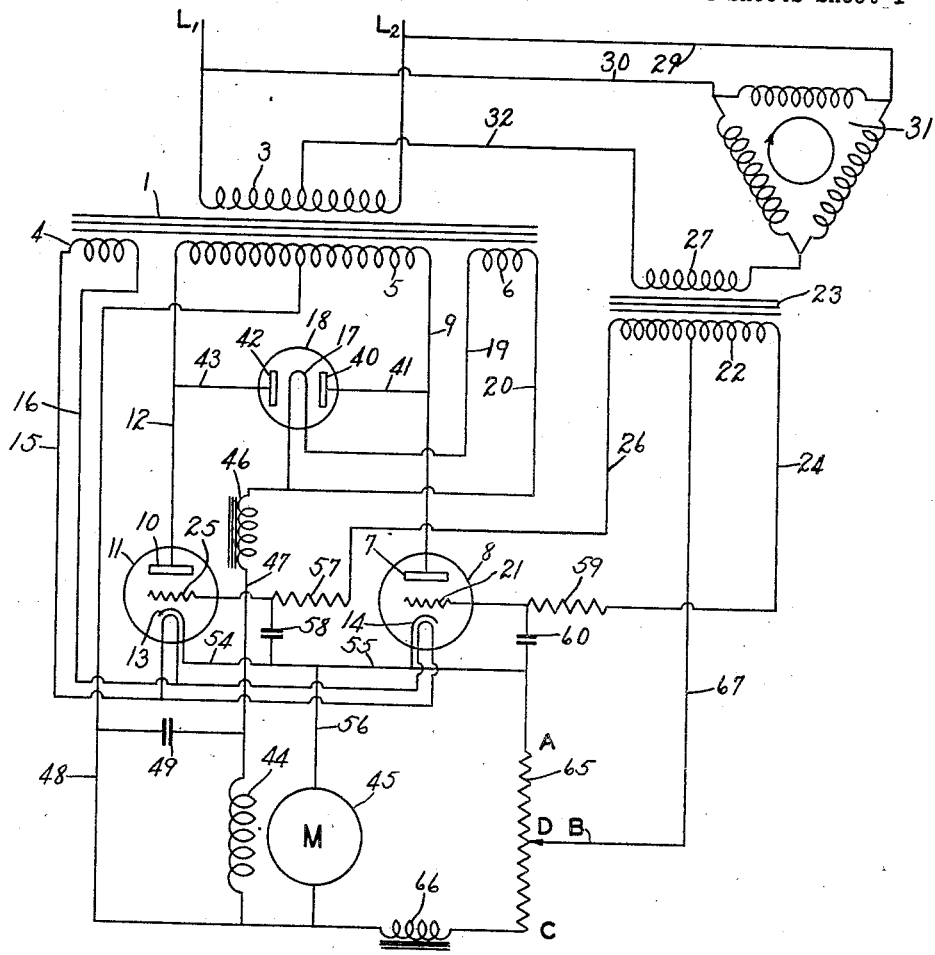
Figure 2:
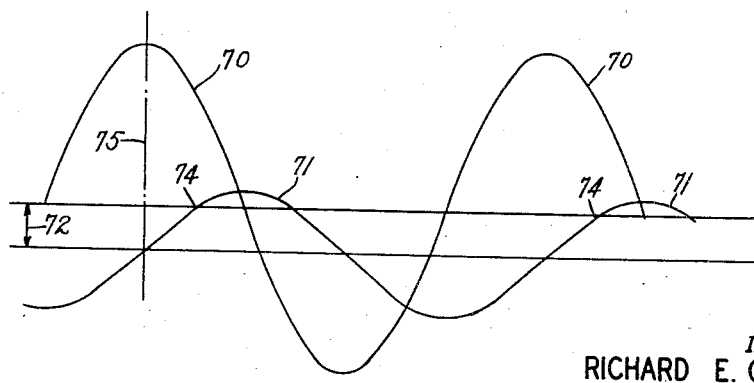
Fig. 2 is a series of curves showing the relationship between the plate voltage and the alternating and direct current grid voltages in the circuit shown in Fig. 1.

Referring to Figs. 1 and 2 of the drawings, my improved circuit comprises a transformer 1 to which current is supplied from an alternating source of power $L_1$, $L_2$ by means of a primary winding 3. The transformer 1 is provided with secondary windings 4, 5 and 6. One of the terminals of secondary winding 5 is connected to the plate 7 of an ignition controlled discharge or grid glow tube 8 by means of a conductor 9 and the other terminal of secondary winding 5 is connected to the plate 10 of ignition discharge or grid glow tube 11 by means of a conductor 12.

Current is supplied from the secondary winding 4 by means of conductors 15 and 16 to the filaments of ignition controlled discharge tubes 11 and 8 to supply heat to cathodes 13 and 14 therein, and the secondary winding 6 supplies current by means of conductors 19 and 20 to heat the filament 17 of rectifier 18.

The grid 21 of ignition controlled discharge tube 8 is connected to one terminal of the secondary winding 22 of a transformer 23 by means of a conductor 24 and the grid 25 of ignition controlled discharge tube 11 is connected to the other terminal of secondary winding 22 by means of a conductor 26. The primary winding 27 of transformer 23 is supplied with current from lines $L_1$ and $L_2$ through conductors 29 and 30 and a three-phase induction motor 31 which is connected to one terminal of the primary winding 27, the other terminal of primary winding 27 being connected to the primary winding 3 by means of a conductor 32.

While any suitable means may be utilized for maintaining the voltage induced in secondary winding 22 in fixed phase relationship with respect to the plate voltage of the ignition controlled discharge tubes, I prefer to use a phaser system including a three-phase induction motor 31, running idle, one terminal of which is connected to the primary winding 27, current being supplied to the other terminals from the lines $L_1$ and $L_2$. Such a phaser system is particularly stable because the inertia of the rotating armature tends to resist any change in the voltage phase which might be caused by the grid current flowing through the ignition discharge tubes. The phase relation between the grid and plate voltages can be governed by the point of connection of conductor 32 with primary of transformer 1. A phase angle of 90 degrees is a convenient amount.

Electrode 40 of rectifier 18 is connected to one terminal of secondary winding 5 by means of conductors 61 and 9 and the other electrode 62 is connected to the opposite terminal of secondary winding 5 by means of conductors 63 and 12. As illustrated in the drawings, the rectifier 10 is a full wave rectifier and a portion of the alternating current supplied by the secondary winding 5 is rectified and passed to the field coil 44 of a motor 45 through choke coil 46 and conductor 47, the current being returned to the middle portion of secondary winding 5 by means of a conductor 48. A condenser 49 is connected across conductors 47 and 48, which together with choke coil 46 serves to filter the voltage impressed upon field coil 44.

The cathode 13 of ignition controlled discharge tube 11 is connected to the motor 45 through conductors 54 and 56 and the cathode 14 of ignition discharge tube 8 is connected to the motor 45 by means of conductors 55 and 56. A resistor 57 is connected in series with the conductor 26 and a condenser 58 is connected across conductors 26 and 54 at a point between the resistor 57 and grid 25. In a like manner a resistor 59 is connected in series with the conductor 24 and grid 21 and a condenser 60 is connected across conductors 24 and 55 at a point between resistor 59 and grid 21. These resistors and condensers are of the usual type and are provided to limit the grid current. The ignition controlled discharge or grid glow tubes 8 and 11 are also of the usual type and contain a vapor such as argon, helium, mercury, neon or caesium.

A potentiometer 65 in series with a surge filter 66 is connected across the armature of motor 45 and a conductor 67 extends from the adjustable arm B of the potentiometer to the middle point of secondary winding 22. An adjustable direct current grid bias is thus provided for grids 21 and 25 of ignition controlled discharge tubes 8 and 11.

In the method of control of the circuit shown in Fig. 1, a variable direct current grid bias is superimposed upon an alternating current grid bias that has in itself a constant amplitude and a fixed phase relation with respect to the plate voltage. The alternating current bias is supplied by transformer 23. The direct current bias is that existing across potentiometer 65. The voltage across potentiometer 65 is the same as the motor voltage except that it has been filtered to some extent by choke 66. It will be apparent from examination that the direct current bias is in effect a self bias as the voltage available is obtained from the tubes 8 and 11.

Referring to Fig. 2 of the drawings, in which curve 70 designates the plate voltage, the curve 71 the alternating current grid voltage and the line 72 the negative direct current grid bias, it will be apparent that when the negative direct current bias 72 is equal to the peak value of the alternating current bias 71, the tubes will not pass any current to the load as the alternating current grid wave 71 will be entirely suppressed. Now if the slider B of potentiometer 65 is located at point C, any attempt of the rectifier to supply voltage across potentiometer 65 of a higher value than the peak voltage of alternating current bias 71 will result in a complete cutoff of the supply voltage. Complete cutoff will drop the voltage across the motor and allow the voltage 71 to rise and open up the tubes again.

The condition will rapidly reach an equilibrium and for a given torque output there will be a fixed ratio between voltage 72 and voltage 71 resulting in a tube opening at say point 74, as illustrated in Fig. 2. Any increase in load on the motor will result in momentarily decreased back electromotive force which will cause a decrease in voltage 72. This will shift the voltage 71 and effect its crossing of the critical ignition voltage of the tubes to the left of point 74 resulting in increased output of the rectifier. A new equilibrium point will be reached at a point where the crossing point of the voltage 71 is sufficiently far advanced with respect to the plate voltage to maintain the demand of the motor for more power to supply the increased load. In a like manner any decrease in load will result in shifting the crossing point of voltage 71 to the right of point 74 causing less power to be delivered to the motor. Substantially constant speed will thus be maintained for varying load conditions.

Now if arm B of potentiometer 65 is moved up towards point A, the voltage AD becomes equivalent to voltage 72 and the motor voltage must be approximately AC/AD times the voltage 72 in order to maintain the proper equilibrium between voltage 72 and voltage 71. Potentiometer 65 is therefore a speed control.

It will be apparent that, with the circuit as shown in Fig. 1, the voltage 72 can never become positive with respect to the cathode so that the portion of the plate voltage wave to the left of the line 75 cannot be utilized. When more power is required than is available from that portion of the cycle to the right of the line 75 the speed regulation is destroyed. Various compounding means to overcome this condition will be explained in connection with the circuits shown in Figs. 3, 4 and 7.

Figure 3:
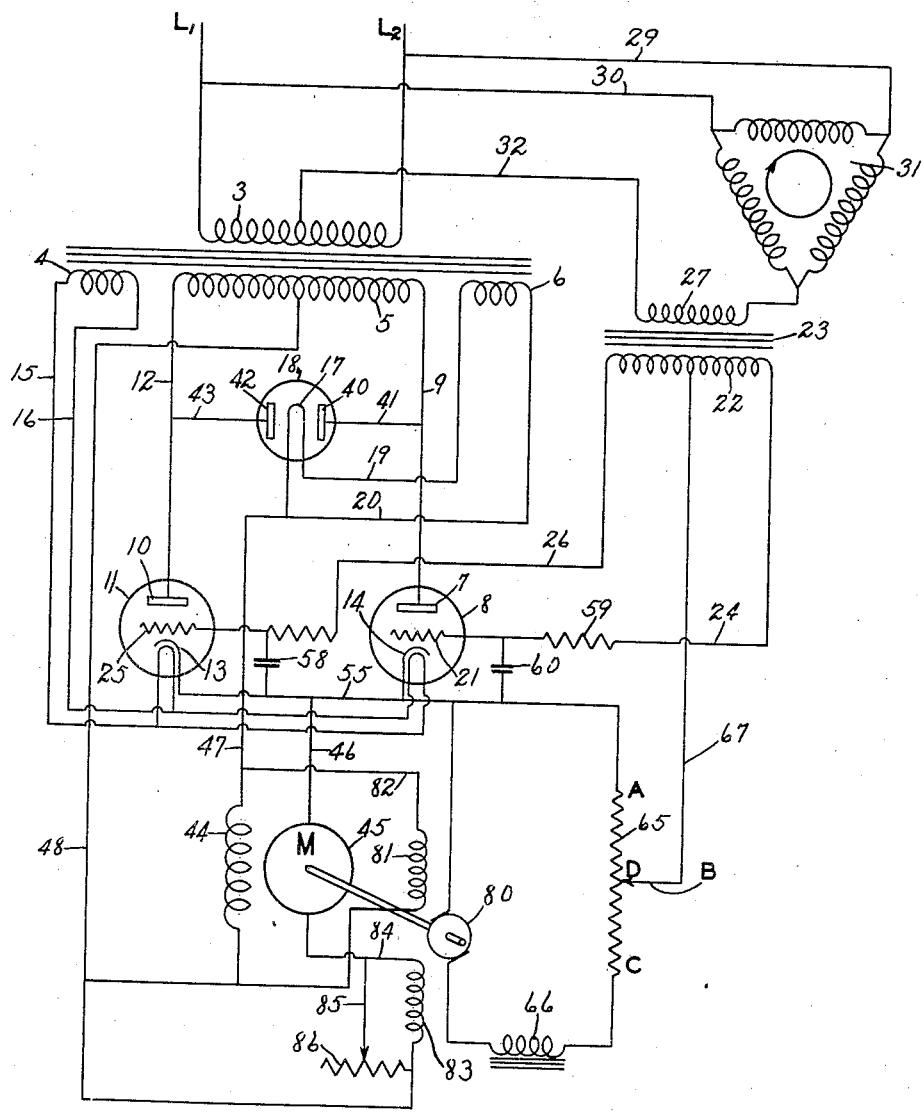
Figs. 3 and 4 are views similar to Fig. 1 in which modified means are shown for varying the direct current grid voltages, including means for compensating for the voltage drop in the motor.

Fig. 3 of the drawings illustrates a modification of the circuit shown in Fig. 1. In this modification a generator 80 is connected to the shaft of motor 45 and is provided with a differentially wound compound field consisting of a constant shunt field 81 which is supplied with current from the rectifier 10 by means of conductors 47 and 82 and a series field 83 which is connected to the armature of motor 45 by means of a conductor 84. The amount of current which passes through the series field may be regulated by means of a shunt circuit consisting of a conductor 85 and an adjustable resistor 86. In this circuit the alternating current grid bias as in fixed phase relation with the plate voltage as in Fig. 1 of the drawings and the variable direct current grid bias is regulated by the difference in potential between the points A and D of potentiometer 65 which is connected across the terminals of generator 80.

In the operation of the circuit if the load on the motor 45 is increased, the speed of the motor will have the tendency to decrease. The increase in load, however, causes an increase of current in generator field 83 which is in series with the armature of motor 45, the result being that the voltage output of generator 80 decreases, since the flux in field 83 opposes the flux in the field 81. The difference in potential across the potentiometer will therefore be decreased and the difference in potential from the points A to D of the potentiometer will be decreased in a proportional amount. The negative direct current grid bias will therefore be decreased, allowing the tubes 8 and 11 to open at an earlier point in the cycle. Consequently, more current will be supplied to the motor. When the series field becomes stronger than the shunt field the voltage 72 will become positive, thus allowing the whole of the plate voltage cycle to be utilized if necessary.

If, on the other hand, a portion of the load is disconnected from the motor 45, the speed of the motor will have the tendency to increase. In such case, the current through series field 83 decreases which results in a greater voltage output of the generator. The voltage across potentiometer 65 therefore increases and the difference in potential between the points A to D increases in a like proportion. The amount of negative grid bias is therefore increased and the grid bias of ignition discharge tubes 8 and 11 will become positive with respect to their cathodes at a later period during the positive portion of the plate voltage cycle, resulting in less current being supplied to the motor 45, thereby maintaining the speed substantially constant. It will be noted that in this circuit the output of the generator is controlled by the current flowing through the motor which depends upon the load. Means are therefore provided to compensate for the IR drop in voltage in the motor.

Figure 4:
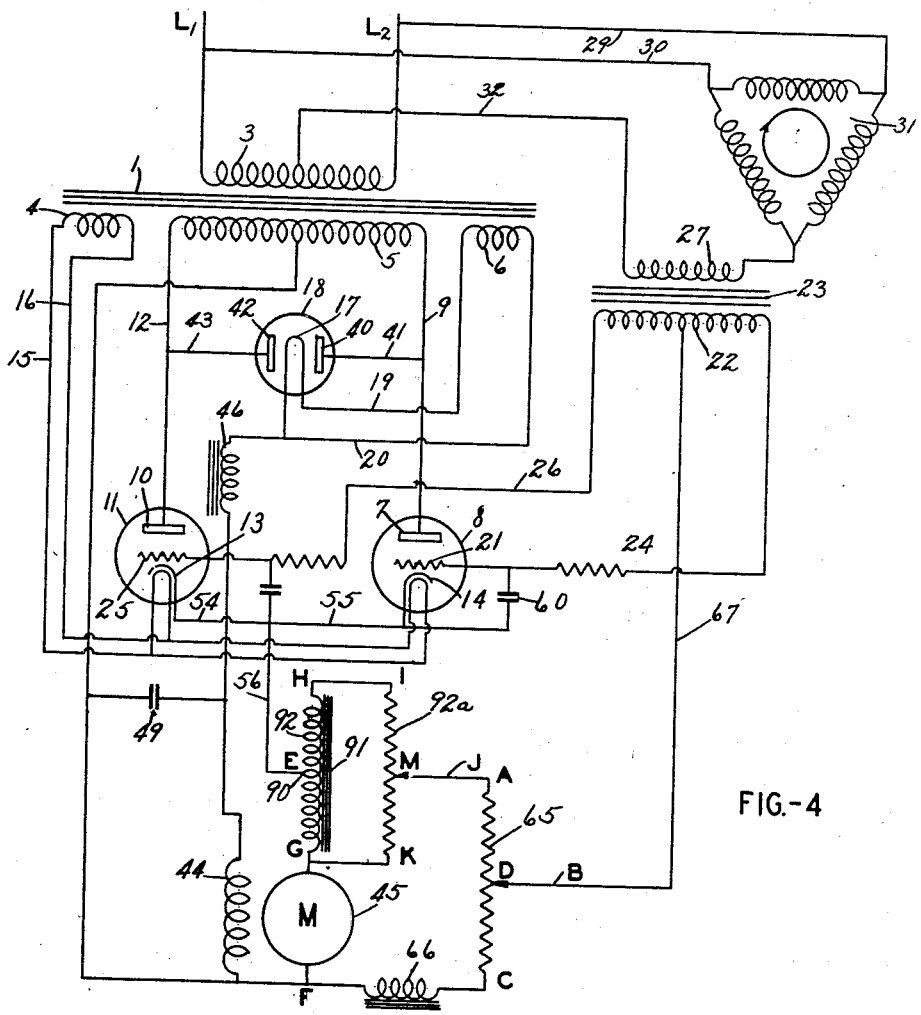

In Fig. 4 of the drawings another modification of the circuit shown in Fig. 1 is illustrated. In this modification conductors 54 and 55 which lead from the cathodes of ignition discharge tubes 8 and 11 are connected by conductor 88 to a fixed point 90 on an autotransformer 91 which is in series with the motor armature and functions both as a choke and a transformer. The terminals of the autotransformer are connected to a compounding control potentiometer 92a having an adjustable arm J which is connected in series with the potentiometer 65. The difference in potential between the points E and F represents the rectified output voltage which is divided into parts EG and FG. The voltage EG represents the voltage drop across the primary of the transformer and is proportional to the amount of motor current. The voltage EG induces in the secondary winding 92 of the autotransformer a voltage HG which is proportional to the amount of primary current and since the potentiometer 92a is connected to the terminals of the autotransformer, the same difference of potential exists between the points I and K of the potentiometer.

Figure 5:
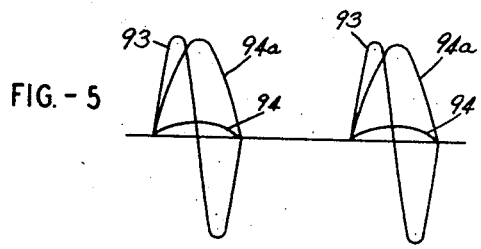
Figs. 5 and 6 are graphs in which the series of curves designate relationship between the plate and the grid voltages in the circuit shown in Fig. 4.
Figure 6:
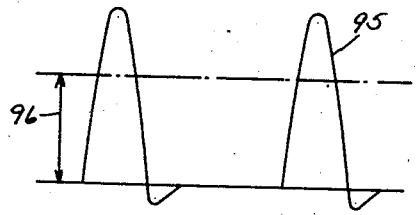

The voltage HG is designated by the curve 93 and the voltage EG by the curve 94a in Fig. 5 of the drawings. The voltage EF which represents the sum of voltages EG and GF is designated by the numeral 94 and when this voltage is added to voltage HG, a voltage having a wave form as shown by the numeral 95 in Fig. 6 of the drawings is obtained. The filter choke coil 66, however, smoothes out the pulsating voltage and a direct current voltage designated by the line 96 is obtained which represents the difference in potential between points I and C as illustrated in Fig. 6 of the drawings.

In the operation of the circuit as shown in Fig. 4, the voltage HG, curve 93, assumes a value proportional to the motor current. The addition of this voltage to voltage EF, curve 94, can result in a voltage 96, Fig. 6, across potentiometer 65 of a greater magnitude than the voltage across the motor. This will in turn cause the voltage of point D to become more positive with respect to the voltage of point E than would be possible with a direct connection as shown in Fig. 1; and when this positive direct current potential is added to the alternating current voltage supplied by transformer 23 the ignition time can be advanced to the left of point 75 as shown in Fig. 2. An effective compounding method is thus provided. The degree of compounding may be varied by adjusting the arm J on potentiometer 92a.

It will be found that for higher speed settings of potentiometer 65, more compounding will be required to maintain a substantially constant speed regulation with varying loads. In other words, it is apparent that without the use of transformer 91, the maximum portion of the plate voltage that can be utilized is that to the right of line 75 in Fig. 2. The addition of voltage 93 to voltage 94 results in changing the voltage at the point D in a positive direction. The point I will therefore be positive with respect to the point E and all other points along the potentiometers will be changed to a more positive value. If full advantage of this higher voltage is taken by having the slider on potentiometer 92a at point I, the voltage at point D may be made positive with respect to point E, resulting in the direct current grid voltage 72 being positive with respect to the plate voltage, thereby shifting the crossing point of the alternating grid voltage to the left of the line 75, as shown in Fig. 2, and enabling the utilization of more of the plate voltage wave.

Figure 7:
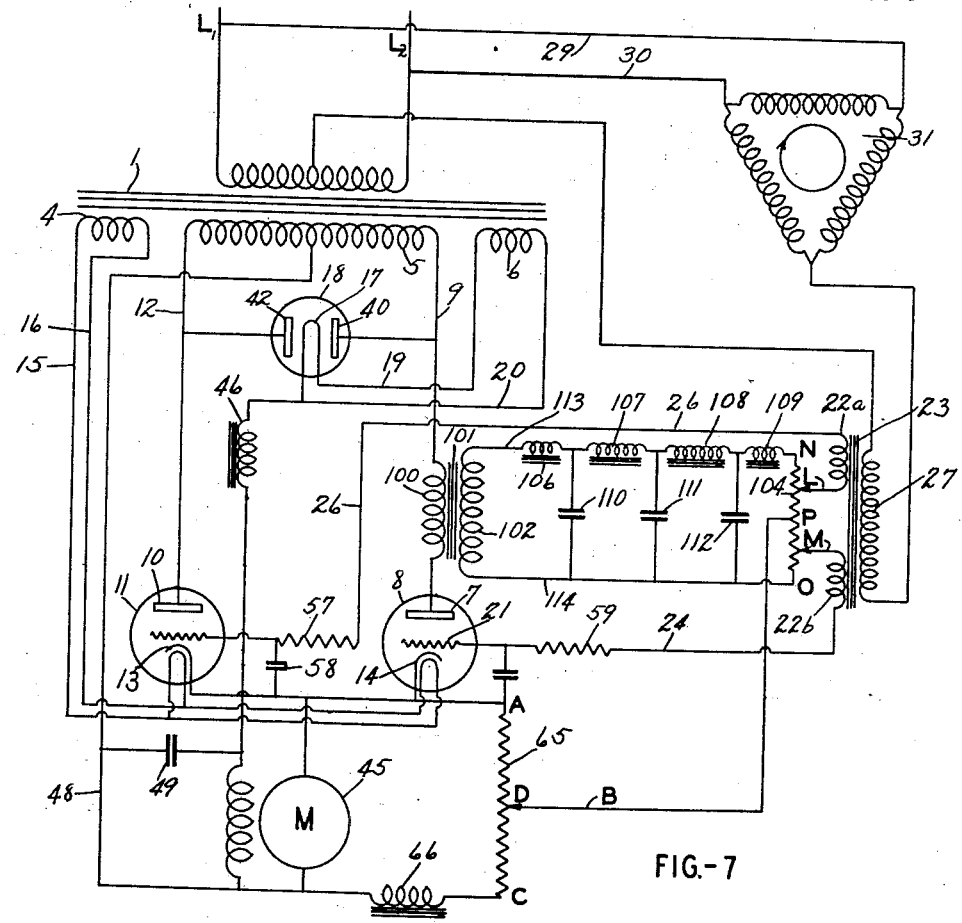
Fig. 7 is a view similar to Fig. 1 showing another method for varying the grid voltage.

Fig. 7 of the drawings illustrates still another method of controlling the speed at which the motor operates. In this circuit, means are also provided for maintaining the speed substantially constant at the predetermined speed. In this modification the winding 100 of transformer 101 is connected in series with the plates 7 or 10 in conductors 9 or 12. A voltage is accordingly induced in the secondary winding 102 of the transformer which is proportional to the plate current. This voltage has a wave form substantially similar to that illustrated by the curve 103 in Fig. 8 of the drawings, and consists of a fundamental frequency and numerous harmonics. This voltage is passed through a low pass filter consisting of a sufficient number of sections to remove the harmonics and shift the phase of the impressed voltage back in phase with the plate voltage. This voltage is impressed upon potentiometer 104 and has a phase and wave form which is substantially similar to curve 105 shown in Fig. 9 of the drawings.

As illustrated in Fig. 7 of the drawings the low pass filter consists of induction coils 106, 107, 108 and 109 and a series of condensers 110, 111 and 112 which are connected across the conductors 113 and 114 at points between the respective coils. This voltage is added to the voltage induced in coils 22a and 22b which are connected by conductors 23 and 24 to the grids of ignition discharge tubes 8 and 11. Since the voltage across potentiometer 104, however, is in phase with the plate voltage, when it is added to the voltage 22a and 22b, a new voltage is obtained which is advanced in phase with respect to the voltage induced in coils 22a and 22b by the primary winding 27. This voltage is designated by the curve 115 in Fig. 10 of the drawings and becomes the A. C. grid bias voltage for ignition discharge tubes 8 and 11. It will also be apparent that the magnitude of voltage impressed upon potentiometer 104 will be increased in proportion to the amount of current flowing through the primary winding 100 while its phase remains practically fixed. The greater the magnitude of this voltage the more voltage 115 is advanced, thereby increasing the amount of current flowing through the ignition controlled discharge tube. On the other hand, if less current flows through the primary winding 100 less voltage will be impressed upon potentiometer 104 and the amount of current which flows through the tubes will be decreased.

Figures 8, 10:
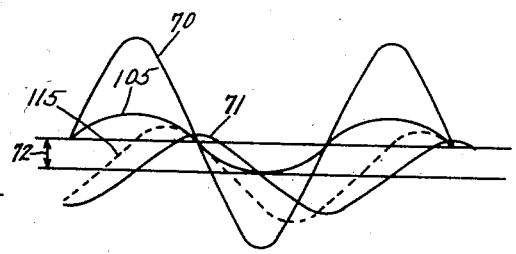
Figs. 8, 9 and 10 are graphs in which the series of curves designate the relationship between the plate and grid voltages in the circuit shown in Fig. 7.
Figure 9:

In this case as in previous cases, however, it is the desire to operate the motor at a predetermined speed and to maintain it substantially constant at that speed. As illustrated in Fig. 10 of the drawings, the negative D. C. grid voltage is determined by adjusting the arm B of potentiometer 65, thereby increasing or decreasing the negative D. C. grid voltage which is designated by the numeral 72 in Fig. 10 of the drawings. If a comparatively high speed is desired, the arm L of potentiometer 104 is set at the point N, the arm M is set at the point O and the arm B of potentiometer 65 is set at a point adjacent the upper portion of potentiometer 65. When low speeds are desired the arms L and M are adjusted towards the point P and the arm B is adjusted toward the point C.

The operation of this circuit for maintaining the speed constant is the same as that disclosed in Fig. 1 of the drawings. However, additional means are provided depending upon the amount of current flowing through the tubes to advance the phase of the grid voltage, and consequently the motor may be operated at higher speeds. Since the current flowing through the tubes is increased when the motor is loaded and the amount of voltage impressed upon potentiometer 104 is dependent on the increase in current, means are also provided to compensate for the increased IR drop in the motor.

While in the circuits described two ignition discharge tubes have been shown, ti will be understood that the circuits would be operative when only a single ignition discharge tube is utilized and also in multiphase circuits.

From the foregoing specification it will be apparent that I have provided an improved circuit for controlling the operation of direct current motors at a predetermined speed and by means of which that speed may be maintained substantially constant.

It will also be seen that I have provided an improved circuit for controlling the operation of direct current motors in which ignition discharge tubes are utilized for rectifying the current and in which a portion of the rectified current is utilized for controlling the speed of the motor.

It will also be apparent that I have provided an improved circuit for controlling the operation of direct current motors from an alternating source of power, including a pair of ignition controlled discharge tubes for rectifying the current supplied to the motor which are partially controlled by direct current voltage and in which means, such as a generator or a transformer, is provided to compensate for the IR drop in the motor load.

It will also be apparent that I have provided an improved cricuit for controlling direct current motors including a pair of ignition controlled discharge tubes for rectifying the current and by means of which the phase of the grid voltage may be varied in accordance with the motor load.

It will also be noted that I have provided improved means, including a phaser for supplying voltage to the grids of ignition discharge tubes which is particularly stable and which tends to prevent any change in phase caused by the flow of current in the ignition discharge tubes.

To those skilled in the art, many modifications and widely different embodiments and applications of my invention will suggest themselves without departing from the spirit and scope thereof. My disclosure and the description herein are purely illustrative and are not intended to be in any sense limiting.

What I claim is:

1. A circuit for controlling the speed of direct current motors comprising a discharge tube having an anode plate, a grid and a cathode, an autotransformer and a direct current motor electrically connected to the cathode of said tube, means for impressing a voltage between the anode and cathode of said tube from an alternating current source of power, an alternating current source of power in fixed phase relation with the plate voltage for impressing voltage upon the grid to cause current to flow to said autotransformer and to the motor, and means proportional to the voltage induced in the secondary winding of the autotransformer and the motor armature voltage for varying the potential of said grid with respect to its cathode.

2. A circuit for controlling the speed of direct current motors comprising a pair of ignition controlled discharge tubes, each having an anode plate, a grid and a cathode, an autotransformer and a direct current motor electrically connected to said cathode, means for impressing an alternating current voltage between the plate and cathode of each tube, means for impressing a voltage from an alternating current source of power upon the grid of each tube which is in fixed phase relation with the plate voltage, and means for impressing a direct current voltage proportional to the voltage induced in the secondary winding of the transformer and the armature voltage of the motor to said grids, thereby regulating the amount of current supplied to said motor.

3. A circuit for controlling the speed of direct current motors comprising a pair of ignition controlled discharge tubes, each having an anode plate, a grid and a cathode, a direct current motor electrically connected to the cathodes of said tubes, means for impressing a voltage from an alternating current source of power upon said plates, a transformer having a secondary winding, one terminal of said secondary winding being electrically connected to the grid of one of said tubes and the other terminal being electrically connected to the grid of the other tube, means for impressing sufficient voltage from an alternating current source of power upon said secondary winding to change the potential of said grids with respect to said cathodes sufficiently to cause current flow through said tubes, a potentiometer connected across the armature of said motor, means for increasing the potential across said potentiometer in addition to the voltage supplied to said motor, and means associated with said potentiometer and electrically connected to the mid portion of said secondary winding for supplying direct current potential to said grid which varies in accordance with the output voltage of said motor, said means being adjustable to vary the speed at which the motor is operated.

RICHARD E. CONOVER.